Sept. 4, 1951 J. F. SMITH 2,566,585
PARACHUTE CONSTRUCTION
Filed June 10, 1948 2 Sheets-Sheet 1
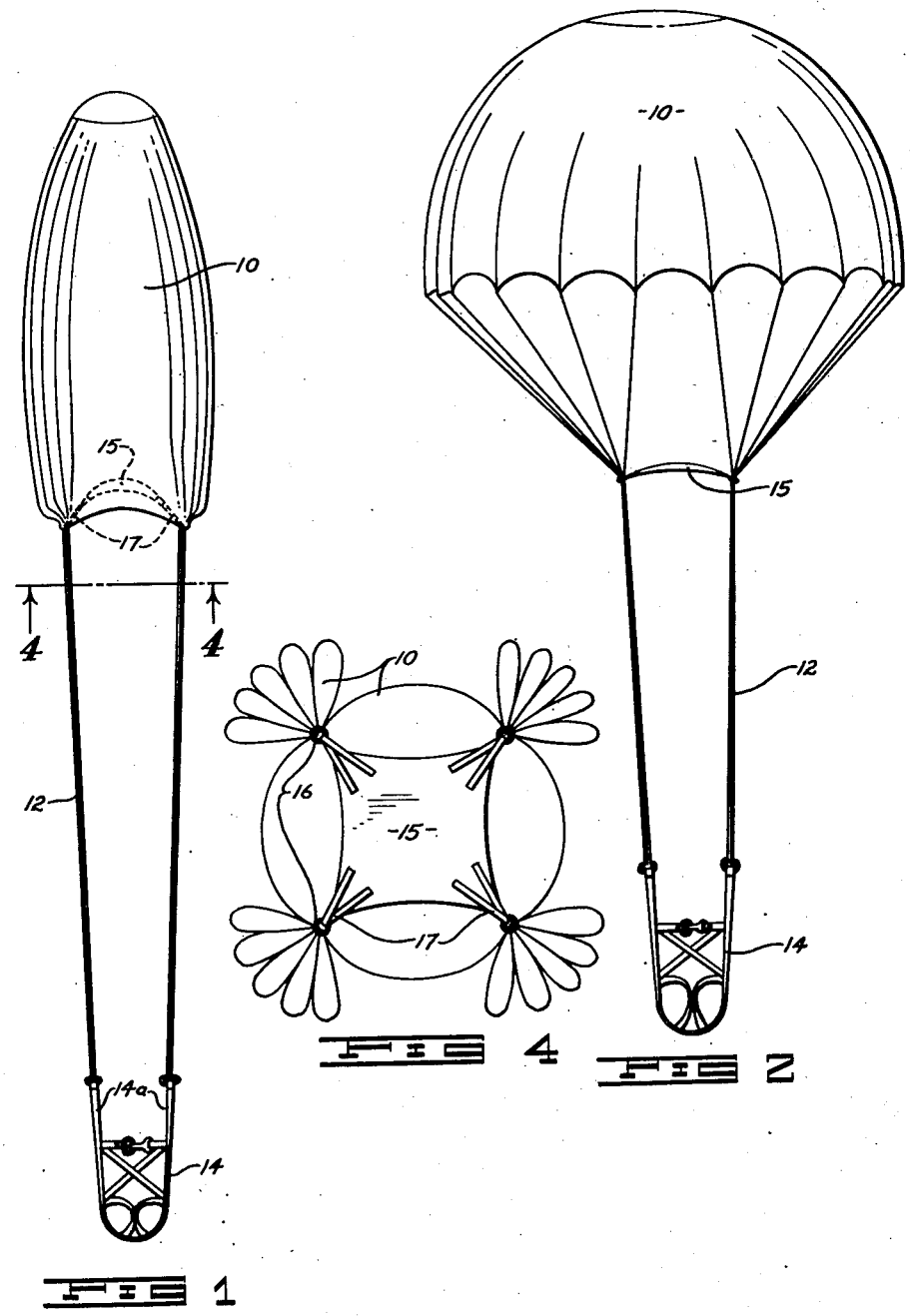
INVENTOR.
J. FLOYD SMITH
BY
*Knight & Rodgers*
ATTORNEYS

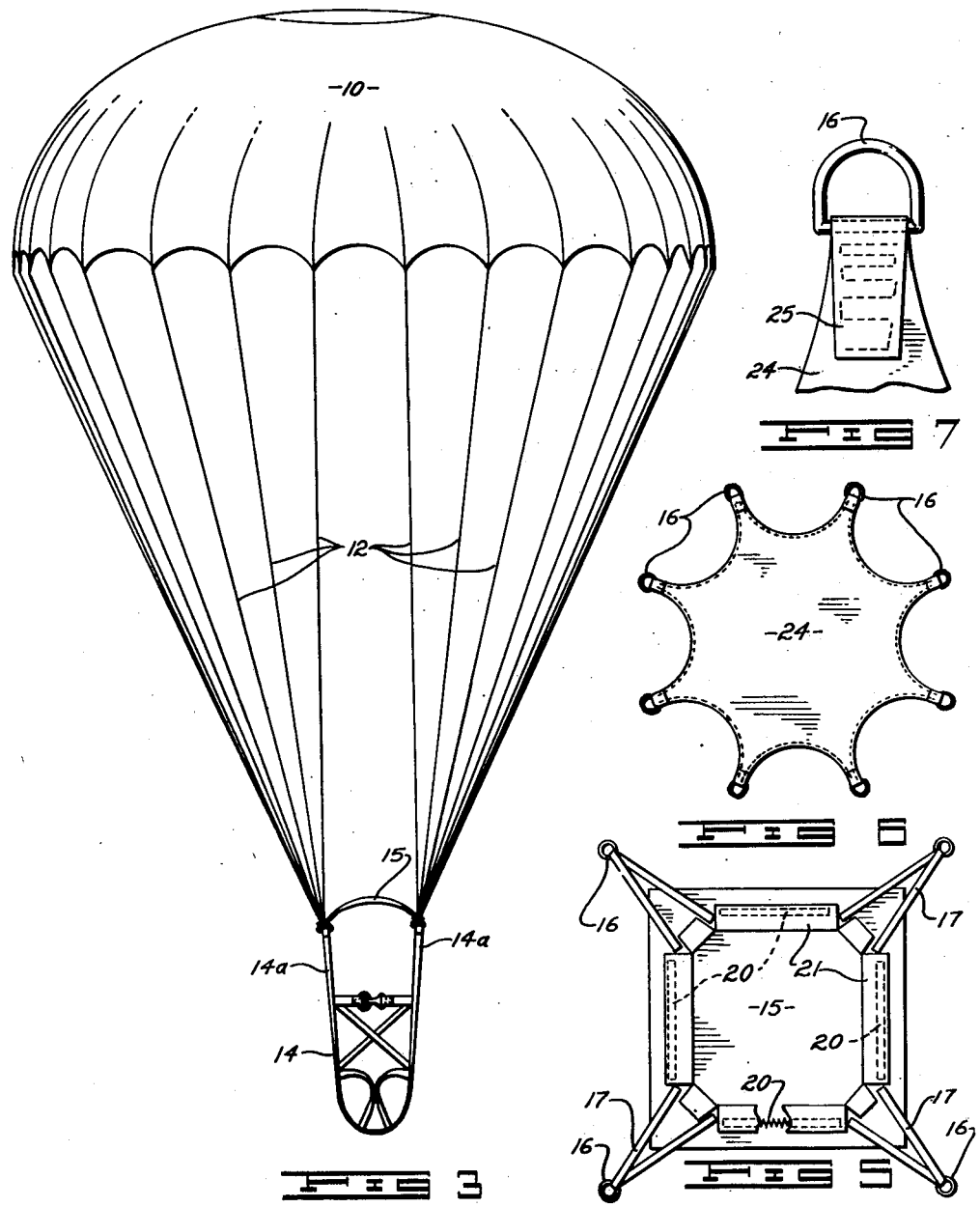

Patented Sept. 4, 1951

2,566,585

UNITED STATES PATENT OFFICE 2,566,585

PARACHUTE CONSTRUCTION

J. Floyd Smith, Glendale, Calif.

Application June 10, 1948, Serial No. 32,223

10 Claims. (Cl. 244—152)

The present invention relates generally to parachutes, and more particularly to improvements in parachute constructions which control opening the parachute in order to reduce the maximum stresses imposed upon the parachute at the time of the opening.

Parachutes are widely used in connection with both military and civilian aircraft for many different types of purposes. Their original and most spectacular use was to permit the crew members or passengers to leave a disabled airplane while in the air in order to make a safe landing themselves, although the airplane might crash. From this humane purpose of saving lives, the parachute has undergone many developments and refinements until it is now a military article of great significance. The parachute enables troops in large numbers to be landed in given areas without necessarily landing the transporting aircraft. Parachute troops are also accompanied by weapons and supplies landed by parachute.

When aircraft are traveling at speeds of 200 miles per hour or less, the stresses imposed upon the elements of the parachute at the time of opening present no particular problem since the conventional types of materials are sufficiently strong, without being unduly heavy, to withstand the shock loads. However, in the present day of high speed aircraft, parachutes are opened at speeds greatly in excess of two hundred miles per hour and the loads imposed upon the parachute elements are so high that they cannot always be successfully withstood. Oftentimes, the loads at opening are so great that the parachute structures are broken and torn, resulting in an extremely rapid rate of descent if not complete ineffectiveness of the parachute. There is obviously an undesirably high loss of personnel and matériel resulting from the failure of parachutes from this cause. And even in those instances when the shock at opening is not so great that the parachute fails, personnel using the parachute are often rather severely injured.

Apart from the difficulties of opening parachutes at high speeds, there have been certain imperfections in the operation of parachutes which result at times in the loss of the loads carried. One of these imperfections in operation has been the very slow opening of the parachute, or its failure to open at all. Parachutes of this type are commonly called "streamers"; and photographs of streamers show that the gores of the parachute have been sucked or blown around the skirt into the mouth of the parachute in such a position that they interfere with or prevent entrance of air into the parachute in a manner to fill out the canopy. For this reason, air does not reach the inner surfaces of the canopy and the latter remains in a collapsed condition instead of opening as it should in response to air pressure.

Another type of defective operation is commonly referred to as "malfunction" and results when parachutes are blown inside out or the suspension lines get over the canopy and prevent the canopy from opening fully. This condition may result in varying degrees of damage; and if the canopy is insufficiently opened, the rate of descent becomes so high that the load carried is lost.

It is obviously desirable that parachutes should be as reliable as possible in performance, both in opening properly and in withstanding all the applied loads so that the parachutes descend safely to the ground. Perfection in performance is desirable not only to land safely personnel and other loads, but also to give the personnel using parachutes a high degree of confidence in the equipment. Because so many of the jumps made by military personnel are voluntary jumps which must be carried out according to schedule, confidence of the personnel in their equipment is essential to proper execution of the military maneuvers involved; and this confidence can be instilled in the using personnel only by eliminating, or substantially so, operational failures of parachutes from all causes.

Thus it becomes a general object of my invention to provide a parachute construction in which the maximum loads imposed upon the elements of the parachute at opening of the canopy are controlled or reduced sufficiently that they are always within the limits of the tensile strength of the various materials used in the parachute.

It is also a general object of my invention to provide a parachute construction adapted to open positively the canopy and thus insure proper descent, thus eliminating failure to open or failure to open properly.

Another object of my invention is to provide a parachute construction which eliminates as far as possible the common operational failures, thus rendering the parachute a highly reliable piece of equipment and one in which using personnel have confidence.

The above objects of my invention are attained by providing a parachute, having a canopy and a plurality of conventional suspension lines connecting the canopy to a harness or other means for carrying a load, with a baffle member which is slidably mounted on the suspension line to move therealong. The baffle is a flexible fabric sheet which is but a small fraction of the structural area of the canopy, so that when the canopy first streams out, but is still collapsed, the baffle is located somewhat above the skirt of the canopy and does not completely fill the mouth. In this way the baffle positively directs air against the inner surface of the canopy skirt, assisting in positive opening of the canopy. When in position near the mouth of the canopy, the baffle confines the suspension lines to a relative close spacing; and as the canopy opens under the pressure of air entering it, the tension in the lines produces a resultant force that slides the baffle downwardly along the line against the air pressure on the baffle and eventually brings the baffle down to a position just above the harness. The baffle operates to retard or reduce the rate at which the canopy opens, thereby reducing the maximum loads imposed upon the elements of the parachute.

How the above objects and advantages of my invention, as well as others not specifically referred to herein, are attained will be better understood by reference to the following description, and to the annexed drawings, in which:

Fig. 1 is a side elevation of a parachute construction embodying my invention, with the canopy collapsed and the parts in the position occupied immediately prior to opening;

Fig. 2 is a side elevation similar to Fig. 1 but with the canopy partially opened;

Fig. 3 is another side elevation similar to Fig. 1 but with the canopy fully opened and the baffle member at the bottom of the suspension lines;

Fig. 4 is an enlarged inverted horizontal section on line 4—4 of Fig. 1 looking upwardly at the mouth of the collapsed parachute showing the aerodynamic baffle;

Fig. 5 is a further enlarged plan view of the baffle detached from the rest of the parachute;

Fig. 6 is a plan view of a modified form of baffle; and

Fig. 7 is an enlarged fragmentary plan showing the manner of attaching rings to the baffle of Fig. 6.

In the drawings, there is shown a parachute which comprises a canopy 10 that is connected by a plurality of shroud or suspension lines 12 to harness 14 by which the parachute is attached to a person. Any type of harness may be used or the suspension lines may be connected directly to a ring or to straps adapted to carry some inanimate load.

These parts of the parachute are illustrated in the drawings as conventional in details and of well known design; and are typical of the various types of parachutes that may be used in connection with my invention. My invention is not limited to any specific details of the canopy, suspension lines, or load carrying means, but may be altered as required to adapt it to other parachutes. For example, there have been developed many different types and designs of canopies such as hemispherical, conical, triangular, lobular, square, etc., and various structural modifications have been made, as for example ribbon 'chutes and tandem 'chutes. These have different specific purposes and normally produce different rates of descent, but my invention is adaptable to use with any of these different types of canopies or parachutes.

The aerodynamic baffle is indicated at 15. It comprises a sheet of relatively strong, flexible fabric, and is preferably square in form as shown in Figs. 4 and 5, although other shapes may be used. As shown particularly in Figs. 4 and 5, the baffle is provided with a plurality of sliding connectors, as loops or rings 16 spaced at equal intervals around the periphery of the baffle. For reasons which will be brought out more fully later, these rings are located outwardly from the solid portion of the baffle represented by the square of fabric material. Where the baffle is regular in outline, as the square shown in Fig. 5, that outline also bounds the aerodynamically effective portion of the baffle; but where the baffle is of irregular outline, the periphery of what may be termed the aerodynamically effective portion may not exactly coincide with the physical periphery of the baffle. In either case, rings 16 are located outwardly of the periphery of the aerodynamically effective portion.

Rings 16 are here four in number and are attached at the corners of baffle 15 by tapes or straps 17 which are securely sewed to the sheet of fabric. The usual type of harness 14 has four upwardly extending webs 14a to each of which is connected a plurality of suspension lines 12. Each harness web thus has connected to it one-fourth of the total number of suspension lines; and the lines going to each harness web are passed downwardly through the same ring 16 so that when the baffle is assembled on the parachute, the baffle is free to slide along the suspension lines between a position at the top of the harness webs, as shown in Fig. 3, and a position at the top of the suspension lines, as shown in Fig. 1.

It is preferable to have as many rings 16 as there are harness webs on harness 14, as this provides for a logical distribution of the suspension lines between the rings 16 and also provides for the greatest range of travel of the baffle along the suspension lines with the least amount of interference with the lines themselves. However, the suspension lines may be connected to the load carrying means at more or less than four points and more or less than four rings may be used, but it is desirable to divide the total number of suspension lines equally, as far as possible, between the several rings 16.

I prefer to provide baffle 15 with four springs 20, or with other resilient members, which are located at or near the margins of the baffle. Springs 20 are tension springs and normally reduce the size of baffle 16, but yield under the force exerted by relatively high air pressure applied to the under side of the baffle to permit the baffle to expand in size. In this way, the size as well as the effectiveness of a given baffle is varied according to conditions encountered during a descent, and especially according to the air pressure applied to the baffle which is ordinarily a function of the rate of descent. Springs 20 are attached to baffle 15 at their ends and then may be left exposed, or the springs are preferably covered by fabric strips 21 stitched to the baffle as shown in Fig. 5, and covering the springs without interfering with their action in contracting the dimensions of the baffle. Steel springs are preferred for the resilient members 20 because the springs operate with greater uniformity of action over a wide temperature range; but other types of members, as for example rubber bands, can be used in place of springs 20.

When the parachute is packed, the aerodynamic baffle is folded inside the folds of the canopy, the baffle being at the upper ends of the suspension lines and free to slide thereon. When the parachute is used, it rapidly extends to full length while the canopy remains collapsed so that the parts initially occupy the relative positions shown in Fig. 1. At this time, baffle 15 operates as a restraining means connected to the suspension lines near the mouth of the collapsed canopy and adapted to confine the several suspension lines to a relatively close spacing. One-fourth of the suspension lines and approximately one of each of the four quarters of the canopy skirt is retained by each ring 16 in its proper position relative to the remainder of the canopy and suspension lines. The restraining action of the baffle and rings prevents wide separation of the lines at the skirt so that the canopy cannot blow over itself or through the suspension lines, and the suspension lines cannot become fouled upon one another.

As a result of this action, the parachute initially assumes a shape substantially as shown in Figs. 1 and 4, with spacing between successive rings 16 equal to approximately the width of one gore at the canopy skirt. Since rings 16 are located outwardly and beyond the periphery of the solid portion of baffle 15, the canopy even in its confined condition has a minimum perimeter larger than and surrounding the perimeter of the baffle, as seen in Fig. 4. The baffle is designed initially to be located above the canopy mouth, as in Fig. 1, a sufficient distance that it is above any folded gore that can blow into the canopy mouth. For example, in the typical standard parachute, the spacing between successive lines 12 at the points of connection to canopy 10 is about one yard. A gore can then blow up into the mouth of a canopy a maximum of a half-yard, assuming a pull on all lines. Straps 17 are long enough that baffle 15 reaches to a height of over a half-yard above the bottom of the canopy skirt. If the typical baffle of the area proportions given below is one yard on each side, the accompanying straps 17 are then about ¼ to ¾ of a yard long, or ¼ to ¾ of the spacing between lines at the skirt of the main canopy if the same proportions are retained for a change in sizes.

This proportioning of parts is adapted so that when baffle 15 is within or above the mouth of the fully collapsed canopy it does not block the free entry of air into the canopy, but air striking the under side of baffle 15 is deflected off the baffle and strikes against the inner surface of the canopy at the skirt. This deflected air blows the folds or gores outwardly and prevents them from being blown inwardly to a position where they are held by air pressure and prevent the canopy from opening. The air deflected against the skirt of the canopy blows the sides outwardly and causes the canopy to fill in the normal manner.

However, the time required for the canopy to fully open is extended by the confinement of the suspension lines by baffle 15. As canopy 10 begins to fill and partially opens, lines 12 are placed under a tension which tends to pull them outwardly through rings 16, as shown in Fig. 2. At this stage in the opening of the parachute, shroud lines 12 do not extend in a straight line from the harness webs to their points of connection with the canopy; but rather they make an angle at the rings 16, as shown in Fig. 2. Because of this angle the tension in each suspension line produces an outwardly and downwardly directed force on baffle 15 at its corners. When the sum of the downward components of these forces is greater than the upward air pressure on the baffle, the baffle slides downwardly along the suspension lines and eventually reaches a position just above the harness webs, as shown in Fig. 3. If the rate of parachute descent is very rapid so that air pressure on the baffle is relatively high, the movement of the baffle downward along shroud lines 12 is either delayed or made relatively slow so that the canopy is confined against fully opening for a longer period of time. It will be obvious that a similar effect results from increasing the relative area of the baffle 15 so that for a given rate of descent, there is a greater upward air thrust on the baffle.

If the baffle is too small it has no aerodynamic effect and cannot operate to check the rate at which the canopy fills and opens, unless rings 16 are very closely spaced from each other, in which event the canopy may be so closely confined as to fail to open. On the other hand, if baffle 15 is too large it completely fills the mouth of the parachute, and deflects air outwardly around the skirt of the canopy rather than into the skirt. Under this condition, the parachute likewise fails to open. In between these two limits there is a wide range of proportions and sizes that the baffle may occupy and still operate satisfactorily. In general, the larger the baffle, the greater the time required to open fully the canopy because of the greater resistance to high air speeds. As a general rule for determining the area of the baffle, I prefer that the baffle have a surface area approximately 1/50 of the structural or surface area of canopy 10, but the ratio can be varied at least by a factor of 2. For use at extreme high speeds or for certain types of cargo-carrying parachutes at which higher rates of descent are permissible, the relative area of the baffle may be increased to as much as approximately 1/25 of the structural area of the canopy. On the other hand, with extremely light loads or with parachutes which should open relatively rapidly in order to adapt them to low altitude work, the size of the baffle may be decreased by fifty per cent, or to approximately 1/100 the area of the canopy.

When baffle 15 is provided with springs 20, a relatively high air pressure on the baffle causes it to enlarge by extending the springs. It thus reacts to the increased air pressure of a very rapid descent or jump at high speed by extending its dimensions and retarding more the rate of opening so that the parachute opens over a longer period of time with a materially decreased maximum stress upon the parachute parts.

The effect of adding my aerodynamic baffle to a conventional parachute is to cause the parachute to open more smoothly and more positively. Rather than suddenly snapping to a fully opened position, in a fraction of a second, as often now occurs, a baffle-equipped parachute opens fully over a longer period of time; yet the 'chute is not delayed in opening if the conditions are such that it would normally open relatively slowly. By lengthening the opening period of the canopy, the rate of descent of the parachute and its load is checked slowly, rather than abruptly; and the lower deceleration so obtained results in lower maximum stresses in the suspension lines and the fabric of the canopy. The baffle either with or without springs 20, but particularly when springs 20 are used, automatically adapts itself to different rates of fall and is more effective at the higher rates of descent because the upward air pressure on the baffle is then greater. In this way the baffle automatically compensates for increased rate of descent to control properly the opening of the canopy.

Any conventional parachute may open over a considerable range of time, depending on many factors, and may vary from a fraction of a second to several seconds. The effect of the baffle is to make the opening rate more uniform. It confines the shroud lines to prevent the canopy from opening too rapidly; at the same time it directs air against the inner surface of the skirt to open the canopy positively and prevent too long a delay. Thus opening is controlled to an extent that it is smoother, more positive, and more uniform in time than heretofore possible.

I have shown in Figs. 6 and 7 a modified form of baffle 24 which is provided with eight rings 16 spaced at equal intervals about the periphery of the baffle. Straps 17 have been eliminated and rings 16 are attached directly to the sheet of fabric forming the baffle. The sheet is deeply indented or scalloped between each two successive rings 16, not only to provide narrow tabs of material 25 by which the rings are attached to the sheet as shown in Fig. 7, but also to provide open areas in the zone between the shroud lines passing through the rings and the main portion of the baffle. Through these open areas air passes to reach and fill the canopy. In this way rings 16 are located outside of and beyond that central portion of baffle 24 which is aerodynamically effective, yet straps 17 as separate members are not used.

Having described a preferred embodiment of my invention, together with certain modifications, it will be understood that various changes in design and application may be made without departing from the spirit and scope of my invention; and consequently I wish it understood that the foregoing description is considered as being illustrative of, rather than limitative upon, the appended claims.

I claim:

1. In a parachute, the combination comprising: a canopy; a plurality of suspension lines connecting the peripheral skirt of the canopy to load carrying means, said lines converging downwardly when the canopy is fully extended; and an aerodynamic baffle extendable above said skirt slidably mounted on the suspension lines at spaced positions around its periphery and movable therealong to control the opening of the canopy.

2. In a parachute, the combination comprising: a canopy; a plurality of suspension lines connected at their upper ends to the periphery of the peripheral skirt of the canopy; load carrying means connected solely to the lower ends of said suspension lines; and a sheet of flexible fabric above the mouth of the collapsed canopy slidably attached at a plurality of positions about its periphery to said suspension lines, said fabric sheet being movable downwardly on the suspension lines in response to tension in the lines to prevent an excessively high rate of opening of the canopy.

3. In a parachute, the combination comprising: a canopy; a plurality of suspension lines connected at their upper ends to the canopy and at their lower ends to load carrying means, said lines converging downwardly when the canopy is fully extended; an aerodynamic baffle slidably mounted on the suspension lines and movable therealong to control the opening of the canopy; and means associated with the baffle adapted to expand and contract the baffle under varying air pressure.

4. In a parachute having a canopy and a plurality of lines connected thereto at spaced positions about the periphery of the canopy skirt, baffle means extendable above the skirt of said canopy slidably attached to the lines to deflect air outwardly against the canopy skirt and pull upwardly and inwardly on the lines adjacent the skirt when said means is at an initial position at the upper ends of the lines.

5. In a parachute, the combination comprising a canopy, a plurality of suspension lines connecting the peripheral skirt of the canopy to load carrying means, and a flexible aerodynamic baffle extendable above said skirt slidably mounted on the suspension lines and movable therealong to control the opening of the canopy, and adapted to prevent air from entering and flowing through the center of the canopy, said baffle provided with a plurality of rings at substantially equally spaced positions around its periphery, the suspension lines passing through the rings.

6. In a parachute, the combination comprising a canopy, a plurality of suspension lines connecting the peripheral skirt of the canopy to load carrying means, and a flexible aerodynamic baffle extendable above said skirt slidably mounted on the suspension lines and movable therealong to control the opening of the canopy and adapted to prevent air from entering and flowing through the center of the canopy, the area of said baffle being a small fraction of the structural area of the canopy.

7. In a parachute, the combination comprising a canopy, a plurality of suspension lines connecting the canopy to load carrying means, and an aerodynamic baffle slidably mounted on the suspension lines and movable therealong to control the opening of the canopy, said baffle provided with resilient means normally contracting the dimensions of the baffle but yielding under air pressure to extend the baffle.

8. In a parachute, the combination comprising a canopy, a plurality of suspension lines connecting the peripheral skirt of the canopy to load carrying means, and a sheet of flexible fabric above the mouth of the collapsed canopy slidably connected at a plurality of positions about its periphery to said suspension lines, said fabric sheet being movable downwardly on the suspension lines in response to tension in the lines to prevent an excessively high rate of opening of the canopy, the area of said sheet ranging from about one-twenty-fifth to about one hundredth of the area of the canopy.

9. In a parachute, the combination comprising a canopy, a plurality of suspension lines connected at their upper ends to the periphery of the canopy, and baffle means extendable above the skirt of said canopy mounted on the suspension lines and held adjacent the canopy skirt at relatively high velocities of descent by air pressure against the baffle means and moved down on the suspension lines by tension in the lines at lower velocities of descent as the lines spread apart, said baffle expansible and adapted to retard the spreading of the lines at higher velocities and to contract as it slides down said suspension lines at lower speeds.

10. In a parachute, a canopy, suspension lines secured to the peripheral skirt of said canopy, a baffle inwardly of said skirt slidably connected with said suspension lines, and extending in upwardly curved disposition above the peripheral skirt of the canopy at its middle portion when said parachute is deployed, and adapted to deflect air outwardly against the inner side of the canopy skirt.

J. FLOYD SMITH.

REFERENCES CITED

The following references are of record in the file of this patent:

UNITED STATES PATENTS

| Number | Name | Date |
|---|---|---|
| 1,266,508 | Ludtke | May 14, 1918 |
| 1,485,400 | Lucas | Mar. 4, 1924 |
| 1,780,104 | Adams | Oct. 28, 1930 |
| 2,120,177 | Hart | June 7, 1938 |
| 2,308,797 | Nasca | Jan. 19, 1943 |
| 2,399,379 | Pence | Apr. 30, 1946 |

FOREIGN PATENTS

| Number | Country | Date |
|---|---|---|
| 496,440 | France | Aug. 4, 1911 |
| 483,042 | Germany | July 5, 1930 |
| 140,460 | Great Britain | Mar. 31, 1921 |